(12) United States Patent
Ding (10) Patent No.: US 8,126,704 B2
(45) Date of Patent: Feb. 28, 2012

(54) APPARATUS, SERVER, METHOD, AND TANGIBLE MACHINE-READABLE MEDIUM THEREOF FOR PROCESSING AND RECOGNIZING A SOUND SIGNAL

(75) Inventor: Ing-Jr Ding, Taipei (TW)

(73) Assignee: Institute for Information Industry, Taipei (TW)

( * ) Notice: Subject to any disclaimer, the term of this patent is extended or adjusted under 35 U.S.C. 154(b) by 1044 days.

(21) Appl. No.: 12/034,199

(22) Filed: Feb. 20, 2008

(65) Prior Publication Data

US 2009/0132258 A1     May 21, 2009

(30) Foreign Application Priority Data

Nov. 20, 2007   (TW) .............................. 96143855 A (51) Int. Cl.
*G10L 19/00* (2006.01)
(52) U.S. Cl. ........ 704/201; 704/219; 704/252; 704/254; 370/352
(58) Field of Classification Search .................. 704/219, 704/252, 254; 370/352
See application file for complete search history.

(56) References Cited

U.S. PATENT DOCUMENTS

| | | | | |
|---|---|---|---|---|
| 4,379,949 | A * | 4/1983 | Chen et al. ..................... | 375/240 |
| 5,819,215 | A * | 10/1998 | Dobson et al. ................ | 704/230 |
| 6,496,794 | B1 * | 12/2002 | Kleider et al. ................ | 704/201 |
| 2005/0094628 | A1 * | 5/2005 | Ngamwongwattana et al. ............................ | 370/352 |
| 2005/0228651 | A1 * | 10/2005 | Wang et al. ................... | 704/207 |

* cited by examiner

*Primary Examiner* — Vincent P Harper
(74) *Attorney, Agent, or Firm* — Patterson Thuente Christensen Pedersen, P.A.

(57) ABSTRACT

An apparatus, a server, a method, and a tangible machine-readable medium thereof for processing and recognizing a sound signal are provided. The apparatus is configured to sense the sound signal of the environment and to dynamically derive and to transmit a feature signal and a sound feature message of the sound signal to the server. The server is configured to retrieve the stored sound models according to the sound feature message and to compare each of the sound models with the feature signal to determine whether the sound signal is abnormal after receiving the feature signal and the sound feature message.

27 Claims, 9 Drawing Sheets

APPARATUS, SERVER, METHOD, AND TANGIBLE MACHINE-READABLE MEDIUM THEREOF FOR PROCESSING AND RECOGNIZING A SOUND SIGNAL

This application claims the benefit of priority based on Taiwan Patent Application No. 096143855 filed on Nov. 20, 2007, of which the contents are incorporated herein by reference in its entirety.

CROSS-REFERENCES TO RELATED APPLICATIONS

Not applicable.

BACKGROUND OF THE INVENTION

1. Field of the Invention

The present invention relates to an apparatus, a server, a method and a tangible machine-readable medium for processing and recognizing a sound signal. More specifically, the present invention relates to an apparatus, a server, a method and a tangible machine-readable medium for dynamically processing and recognizing a sound signal.

2. Descriptions of the Related Art

As sound detecting technologies develop over recent years, a variety of sound detection applications have also been generated. Generally, in sound detecting applications, detected sound is categorized as either a normal sound or an abnormal sound. A normal sound is a sound that can be normally ignored by people, such as the noise from cars, talking, and music that may be heard on the streets. An abnormal sound is a sound that easily grabs a person's attention, such as a scream, a fire alarm, or a cry for help. In cases where sound detecting applications are used for security and monitoring, the detection of sound can help the security personnel take further actions.

Figure 1:
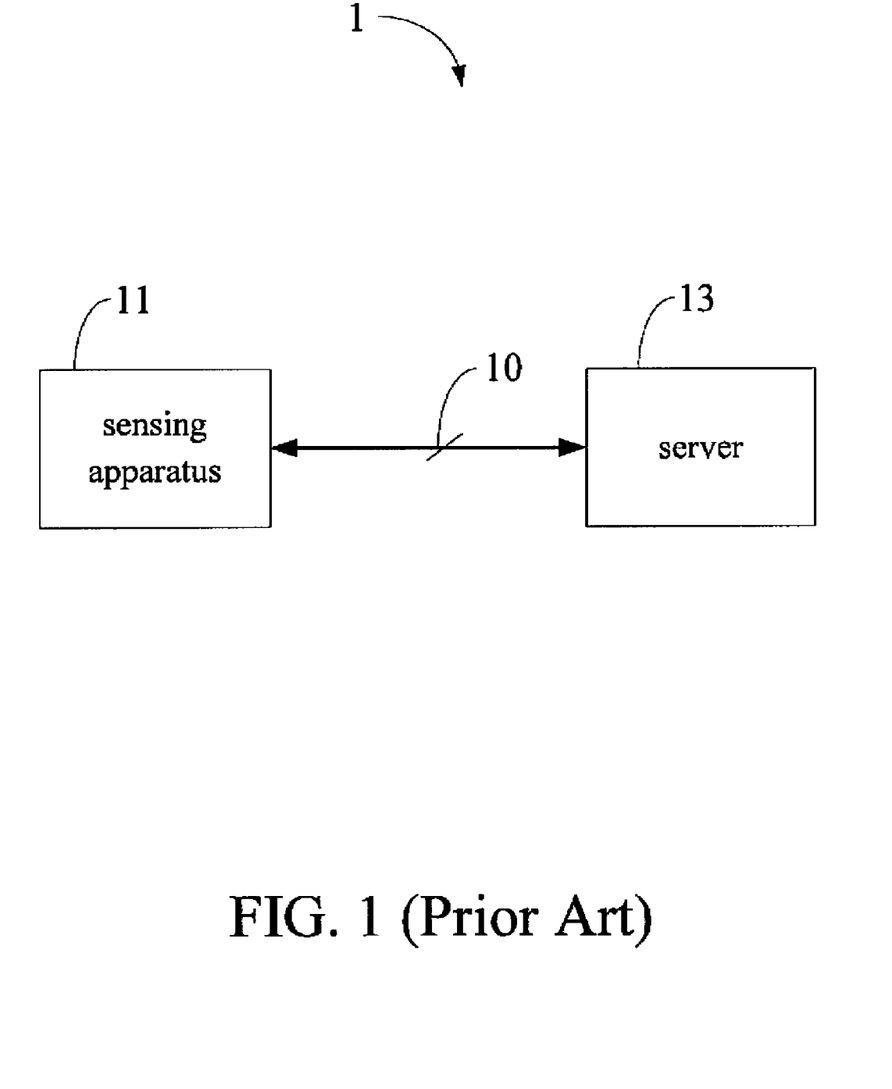
FIG. 1 is a schematic diagram of a conventional sound detection system.

In practice, a sound detection application may also be combined with the increasingly widespread use of wireless networks. FIG. 1 illustrates a conventional sound detecting system 1, which comprises a sensing apparatus 11 and a server 13 that are connected to each other via a wireless network. The sensing apparatus 11 is configured to sense a sound signal 10 in the environment and to transmit the sound signal 10 to the server 13. The server 13 then retrieves a sound feature signal from the sound signal 10 and compares the sound feature signal to a plurality of sound models pre-stored in the server 13 to determine whether the sound signal 10 is abnormal. In this way, a real-time response may be made with improved flexibility.

Since the sound detection system 1 is implemented by a wireless network, the bandwidth of the wireless network will have significantly effect on the real-time response. More particularly, when the sound signal is sensed, the sensing apparatus 11 of the sound detection system 1 transmits it to the server. However, the sound signal usually represents in a large data mount, which means that the relatively long time duration or large bandwidth will be occupied to transmit the sound signal from the sensing apparatus 11 to the server 13. When the wireless network has a poor quality or a limited bandwidth, the sound detection system 1 would fail to make a real-time response, and the accuracy of determination made by the server 13 on the sound signal will be degraded.

Accordingly, it is important to effectively eliminate the impact of the wireless network quality on the real-time response of the sound detection system and to improve the accuracy of the signal.

SUMMARY OF THE INVENTION

One objective of the present invention is to provide a method for processing a sound signal. The method comprises the following steps of: detecting the sound signal; detecting an available bandwidth of a network; deciding a sound feature parameter according to the available bandwidth; retrieving a sound feature signal from the sound signal according to the sound feature parameter; retrieving a sound feature message related to the sound signal; and transmitting the sound feature signal and the sound feature message to a server.

Another objective of the present invention is to provide an apparatus for processing a sound signal, which is wirelessly connected to a server via a network. The apparatus comprises a first detection module, a second detection module, a decision module, a retrieval module and a transmission module. The first detection module is configured to detect the sound signal; the second detection module is configured to detect an available bandwidth of the network; the decision module is configured to decide a sound feature parameter according to the available bandwidth; the retrieval module is configured to retrieve a sound feature signal from the sound signal according to the sound feature parameter and to retrieve a sound feature message related to the sound signal; and the transmission module is configured to transmit the sound feature signal and the sound feature message to the server.

Yet a further objective of the present invention is to provide a tangible machine-readable medium that stores a computer program, wherein the computer program is configured to enable an apparatus to execute a method for processing a sound signal. The method comprises the following steps of: enabling the apparatus to detect the sound signal; enabling the apparatus to detect an available bandwidth of a network; enabling the apparatus to decide a sound feature parameter according to the available bandwidth; enabling the apparatus to retrieve a sound feature signal from the sound signal according to the sound feature parameter; enabling the apparatus to retrieve a sound feature message related to the sound signal; and enabling the apparatus to transmit the sound feature signal and the sound feature message to a server.

Still another objective of the present invention is to provide a method for recognizing a sound signal The method comprises the following steps of: receiving a sound feature signal and a sound feature message related to the sound signal; retrieving a plurality of first sound models and a plurality of second sound models from a database according to the sound feature message; comparing the sound feature signal with the first sound models to generate a plurality of first similar values; comparing the sound feature signal with the second sound models to generate a plurality of second similar values; summing up the first similar values to derive a first sum; summing up the second similar values to derive a second sum; and determining that the sound signal is an abnormal signal according to the first sum and the second sum.

Yet another objective of the present invention is to provide a server for recognizing a sound signal, which comprises a database, a receiving module, a retrieval module, a comparison module, a calculation module and a determination module. The database stores a plurality of first sound models and a plurality of second sound models, while the receiving module receives a sound feature signal and a sound feature message related to the sound signal. The retrieval module retrieves the first sound models and the second sound models from the database according to the sound feature message. The comparison module compares the sound feature signal with the first sound models to generate a plurality of first similar values and to compare the sound feature signal with the second sound models to generate a plurality of second similar values. The calculation module sums up the first similar values to derive a first sum and to sum up the second similar values to derive a second sum. The determination module is configured to determine if the sound feature signal is an abnormal signal according to the first sum and the second sum.

Yet a further objective of the present invention is to provide a tangible machine-readable medium storing a computer program, wherein the computer program is configured to enable a server to execute a method for recognizing a sound signal. The method comprises the following steps of: enabling the server to receive a sound feature signal and a sound feature message related to the sound signal; enabling the server to retrieve a plurality of first sound models and a plurality of second sound models from a database according to the sound feature message; enabling the server to compare the sound feature signal with the first sound models to generate a plurality of first similar values; enabling the server to compare the sound feature signal with the second sound models to generate a plurality of second similar values; enabling the server to sum up the first similar values to derive a first sum; enabling the server to sum up the second similar values to derive a second sum; and enabling the server to determine if the sound feature signal is abnormal according to the first sum and second sum.

The technologies provided by the present invention may be used to sense a sound signal in the environment, retrieve a feature signal and feature message from the sound signal, and transmit them to a server. Upon receiving the feature signal and the feature message of the sound signal, the server retrieves pre-stored sound models according to the feature message, and compares the feature signal with the pre-stored sound models to determine if the sound signal is abnormal. Since only the feature signal of the sound signal is sent to the server, the adverse impact of the wireless network quality on the real-time response of a sound detection system is effectively mitigated and the determination of the sound signal is more accurate.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
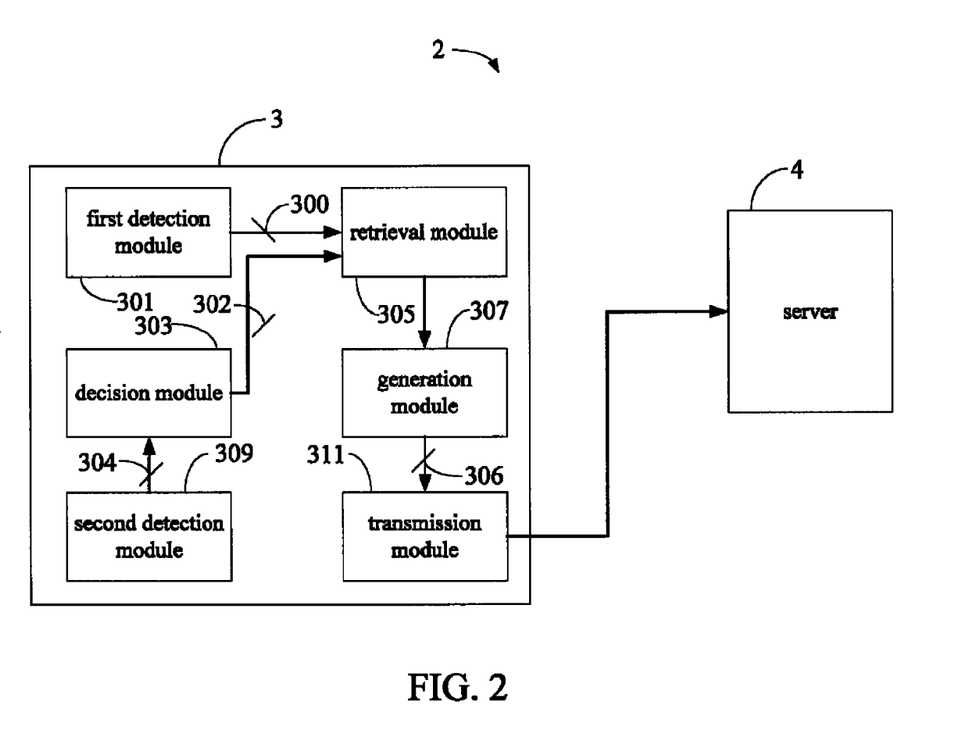
FIG. 2 is a schematic diagram of an apparatus incorporated in the system of the first embodiment.

FIG. 2 illustrates a first preferred embodiment of the present invention, which is a system 2 for processing and recognizing a sound signal 300. The system 2 comprises an apparatus 3 for processing a sound signal 300 and a server 4 for recognizing the sound signal 300. In this embodiment, the apparatus 3 is connected to the server 4 via a wireless network (e.g., Wi-Fi, WiMAX or ZigBee). However, the connection method is only for convenience of description and is not used to limit the present invention. In other embodiments, the apparatus 3 may alternatively be connected to the server 4 via other wireless means, which may be readily implemented by those skilled in the art and will not be described herein.

The system 2 operates in two stages. In the first stage, the apparatus 3 first processes the sound signal 300 and transmits a sound feature to the server 4. Then in the second stage, the server 4 tries to recognize the sound signal. Accordingly, this embodiment will be described in two stages.

First, the apparatus 3 processing the sound signal 300 will be described. The apparatus 3 comprises a first detection module 301, a decision module 303, a retrieval module 305, a generation module 307, a second detection module 309, and a transmission module 311. The first detection module 301 is configured to detect the sound signal 300 in the environment where the apparatus 3 is located. In other words, the first detection module 301 is configured to sense any sound from the environment where the apparatus 3 is located to derive the sound signal 300.

The decision module 303 is configured to decide a sound feature parameter 302 for use in the subsequent processing of the sound signal. More specifically, during the processing and recognizing process, a feature is retrieved from the sound signal at the front-end of processing the sound signal to facilitate the successful recognition of the sound signal at the back-end. Sound features that are commonly adopted include Mel-scale Frequency Cepstral Coefficients (MFCCs), Linear Predictive Cepstral Coefficients (LPCCs), and cepstrals. In this preferred embodiment, the LPCC is adopted as sound features. The amount of data that the LPCC contains is determined by an order; the higher the order is, the more data the LPCC contains, and the more accurate the recognition results. Additionally, the order of LPCC is generated according to the Linear Predictive Coefficient (LPC), which is well-known by those skilled in the art and will not be described herein. In this preferred embodiment, the sound feature parameter 302 is an order of the LPCC.

More particularly, before deciding the sound feature parameter 302, the decision module 303 decides a reference feature parameter (assuming that the reference feature parameter is the order of LPCC, for example, 13). Then, the decision module 303 determines if the reference feature parameter needs to be adjusted to obtain the sound feature parameter 302. Specifically, the decision module 303 determines a plurality of frames of the sound signal 300 within a predetermined time interval according to the reference feature parameter. That is, the decision module 303 processes the sound signal 300 according to a time order to generate a plurality of frames overlapped on a one-by-one basis, as frames 50~53 shown in FIG. 3. Overlapping areas between these frames 50-53 are not fixed, and the decision module 303 decides these frames within the predetermined time interval by the overlapping areas. Assuming that the predetermined time interval is one second, the decision module 303 decides frames contained within such the predetermined time interval (i.e. one second) according to the reference feature parameter. The way to decide the frames according to the overlapping areas will be described in detail hereinafter.

Upon determining the frames within the predetermined time interval, the decision module 303 calculates a number of the frames within the predetermined time interval. Herein, it is assumed that 10 frames exist within the predetermined time interval, so the number of the frames is 10. Then, the decision module 303 calculates the data amount contained within the predetermined time interval according to the number of frames and the reference feature parameter. Specifically, since the order of the LPCC determines how much data is contained within the LPCC (i.e., how much data is contained within each frame), the data amount contained within the predetermined time interval can be calculated based on the number of frames and the reference feature parameter. For example, if the LPCC with order one represents 10 bits of data, with the aforesaid assumption (i.e., LPCC with thirteenth order and 10 frames), the data amount contained within the predetermined time interval will be 10×13×10=1300 bits.

Additionally, the second detection module 309 is configured to detect an available bandwidth 304 of the network and to transmit a message indicating the bandwidth 304 to the decision module 303, so that the decision module 303 may decide the sound feature parameter 302 according to the data amount contained within the predetermined time interval and the available bandwidth 304. Specifically, the decision module 303 determines whether the data amount is smaller than or is equal to the available bandwidth 304. If so, the sound feature parameter 302 is decided as a reference feature parameter. If not, in this embodiment, the decision module 303 decreases a value of the reference feature parameter, for example from a thirteenth order to a twelfth order. Then, according to the decreased reference feature parameter (now becomes the LPCC of the twelfth order), repeats the above process to decide frames within the predetermined time interval, to calculate the number of the frames within the predetermined time interval, to calculate the data amount contained within the predetermined time interval, and to determine if the data amount is smaller than or equal to the available bandwidth 304. This process is repeated until the data amount does not exceed the available bandwidth 304. In other words, the decision module 303 decides a sound feature parameter 302 by determining if a currently available bandwidth is sufficient to carry the data amount contained within the predetermined time interval. Here, it should be noted that since the initial order of the LPCC is derived from an order of the LPC, the lowest order the LCPP is equal to the order of the LPC. For example, if the LPCC has an initial order of thirteen and the LPC has an order of ten, then the lowest order of the LCPP is 10.

Figure 3:
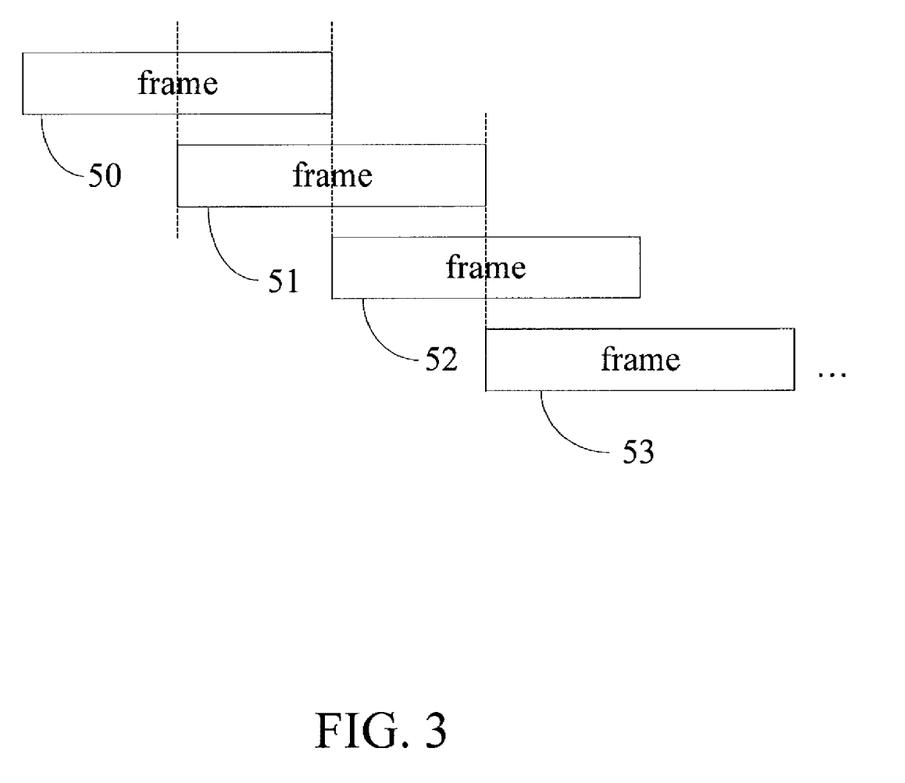
FIG. 3 is a schematic diagram of the frames of a sound signal.

Next, descriptions will be made on how the decision module 303 decides the frames of the sound signal within the predetermined time interval according to the reference feature parameter; i.e., decides the frames within the predetermined time interval by deciding the overlapping areas between the frames. Initially, the deciding module 303 determines if the sound signal 300 is a speech signal. If not, the decision module 303 waits until a new sound signal is inputted for another determination. If the sound signal 300 is a speech signal, the decision module 303 decides a first frame 50 of these frames, i.e., decides the size of the first frame 50 of the sound signal 300 within the predetermined time interval according to the reference feature parameter (i.e., a predetermined order of LPCC), and all subsequently generated frames will have the same size as the first frame 50. Then, according to the first frame 50, the decision module 303 decides a plurality of possible second frames within the predetermined time interval, each of which has a different overlapping area with the first frame 50. For example, if the first frame 50 and the possible second frames all have a length of 20 ms, and the first frame 50 has an overlapping area of 10 ms, 8 ms, 6 ms, 4 ms, 2 ms and 0 ms respectively with the possible second frames, then the number of the possible second frames is six. The decision module 303 calculates an error value for each of the six possible second frames respectively, i.e., to derive six error values. These error values are linear prediction coefficient residual error values, which may be calculated with conventional technologies and will not be described again. After calculating the six error values, the decision module 303 chooses the minimum one of the six error values, and determines a possible second frame corresponding to the minimum error value as the second frame (i.e., frame 51). Then, the above operations are repeated to decide the next frame until the total time length of these frames is not smaller than that of the predetermined time interval. In other words, the decision module 303 decides the frames of the sound signal 300 within the predetermined time interval according to the reference feature parameter. These frames have the same size but not necessarily have the same overlapping areas.

After describing how to decide the frames within the predetermined time interval and further decide the sound feature parameter, the subsequent operations will hereby be described. In reference to FIG. 2, the retrieval module 305 is configured to retrieve the sound feature signal (i.e., an LPCC of the sound signal 300) from the sound signal 300 and a sound feature message related to the sound signal 300 according to the sound feature parameter 302. As the sound feature signal is the LPCC of the sound signal 300, the method to obtain the sound feature signal can be achieved by conventional technologies; therefore will not be described here. The sound feature message comprises messages for use by the server 4 in processing the sound feature signal, where the messages may comprise the time length, starting time and the order of LPCC of the sound signal 300. The generation module 307 is configured to generate a packet 306 comprising the sound feature signal and the sound feature message. The transmission module 311 then transmits the packet 306 to the server 4 to achieve the transmission of the sound feature signal and the sound feature message to the server 4.

Figure 4:
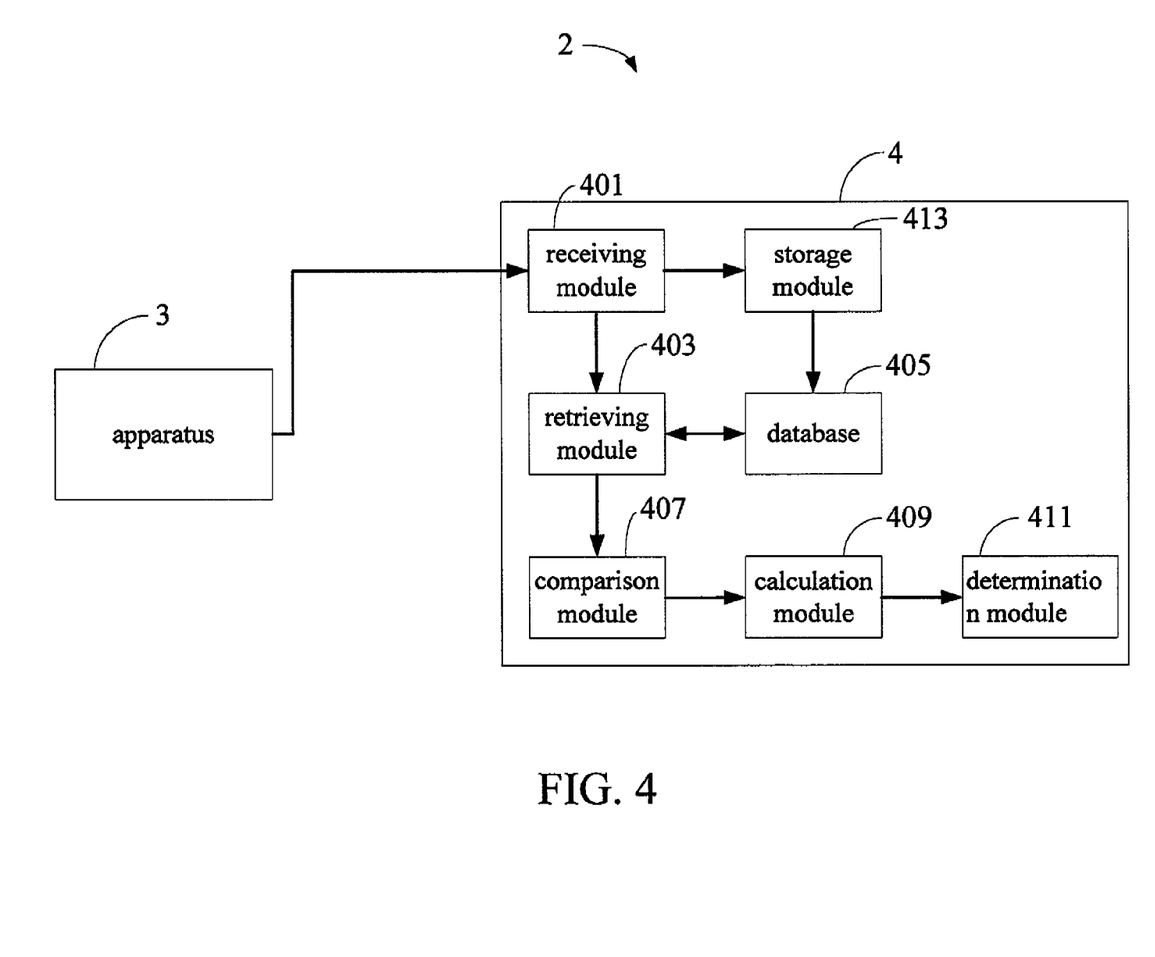
FIG. 4 is a schematic diagram of the server incorporated in the system of the first embodiment.

Next, a recognition process carried out by the server 4 will be described. FIG. 4 schematically illustrates the server 4 included in the system 2. As described above, the server 4 is configured to recognize the sound signal 300. The server 4 comprises a receiving module 401, a retrieval module 403, a database 405, a comparison module 407, a calculation module 409, a determination module 411, and a storage module 413. The database 405 is configured to store a plurality of first sound models and a plurality of second sound models. In more detail, in this preferred embodiment, all kinds of sound are categorized as either a normal sound or an abnormal sound, so the first sound models and the second sound models are normal sound models and abnormal sound models respectively. Furthermore, the first sound models and the second sound models are implemented by Gaussian Mixture Models (GMMs) in this embodiment.

The receiving model 401 is configured to receive the sound feature signal and the sound feature message related to the sound signal 300. Particularly, as the sound feature signal and the sound feature message are transmitted from the apparatus 3 to the server 4 via a wireless network, the receiving module 401 is adapted to receive a network packet, from which the sound feature signal and the sound feature message will be retrieved.

The retrieval module 403 is configured to retrieve the first sound models and the second sound models from the database 405 according to the sound feature message, wherein the sound feature message is an order of the LPCC of the sound feature signal in this embodiment. The comparison module 407 is configured to compare the sound feature signal with the first sound models and the second sound models to generate a plurality of first similar values and a plurality of second similar values respectively. The comparison module 407 may make these comparisons by means of conventional technologies, and this will not be described again.

The calculation module 409 is configured to sum up the first similar values to derive a first sum, and to sum up the second similar values to derive a second sum. The determination module 411 is configured to determine whether the sound feature signal is an abnormal signal or a normal signal according to the first sum and the second sum. Specifically, if the second sum is greater than the first sum, the sound feature signal is determined as an abnormal sound. On the contrary, the sound feature signal is determined as a normal sound. Additionally, the storage module 413 is configured to store the sound feature signal and the sound feature message into the database 405 for subsequent use. For example, the sound feature message is stored in a lookup table into the database 405.

With the configuration described hereinabove, the present invention dynamically detects a currently available bandwidth to decide how much data of the sound feature signal a front-end apparatus for processing the sound signal shall transmit to the back-end server for recognizing the sound signal. By the present invention, a system for processing and recognizing a sound signal in real-time responses is implemented. On the other hand, considering the fact that a limited bandwidth would lead to a decreased order of the LPCC and consequent degradation of the recognition rate, the present invention also dynamically adjusts a size of the overlapped area between the frames, thereby to decrease the error and increase the recognition rate.

Figure 5:
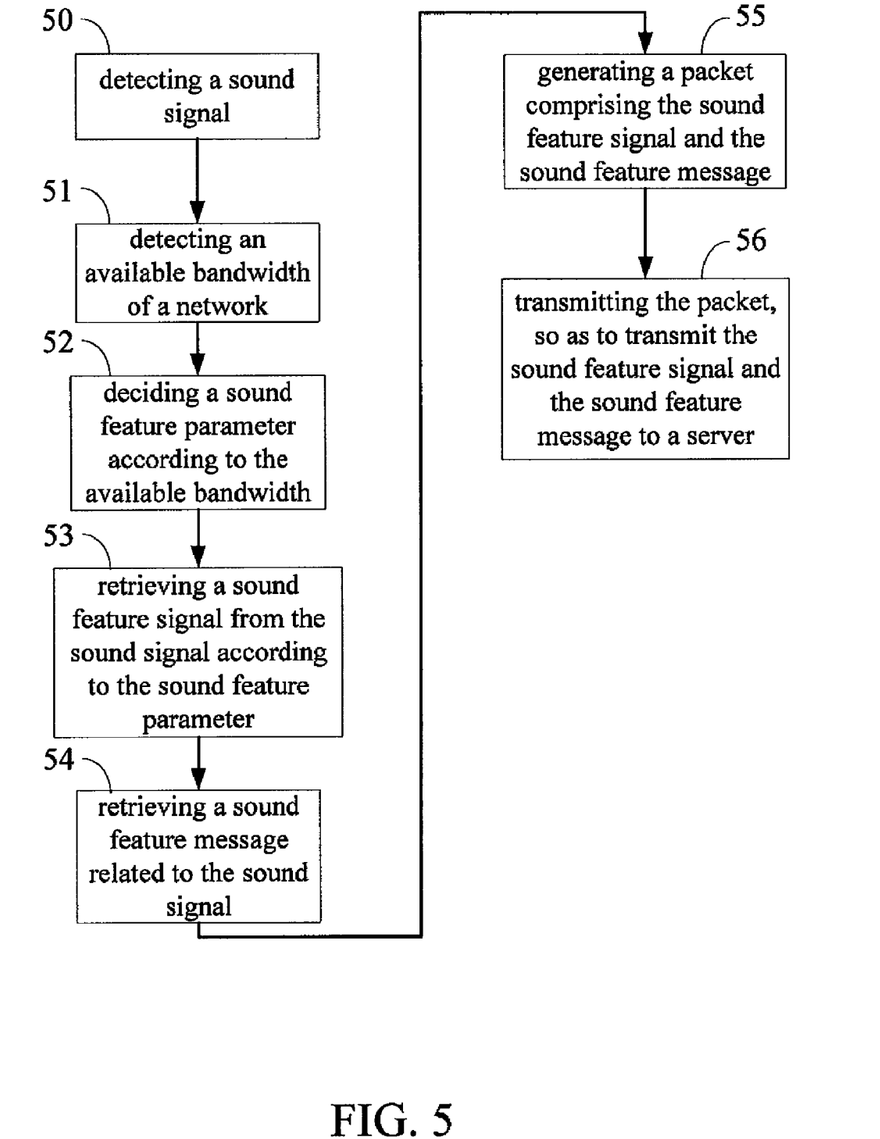
FIG. 5 is a flow chart of a second embodiment.

A second preferred embodiment of the present invention is illustrated in FIG. 5, which is a flow chart of a method for processing a sound signal. This method begins with step 50, where a sound signal is detected. Next, an available bandwidth of a network is detected in step 51, and a sound feature parameter is decided according to the available bandwidth in step 52.

Figure 6:
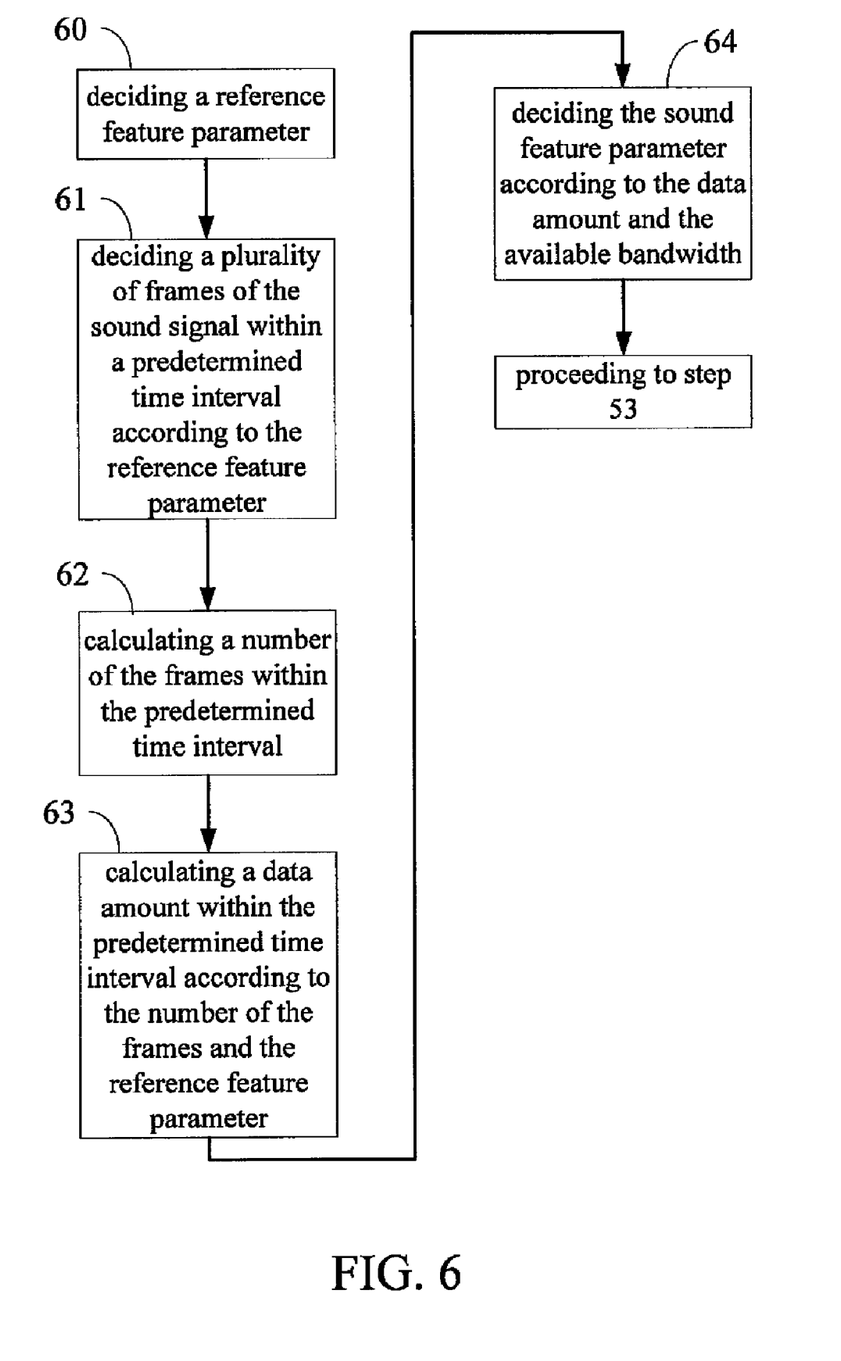
FIG. 6 is a detailed flow chart of step 52 in the second embodiment.
Figure 7:
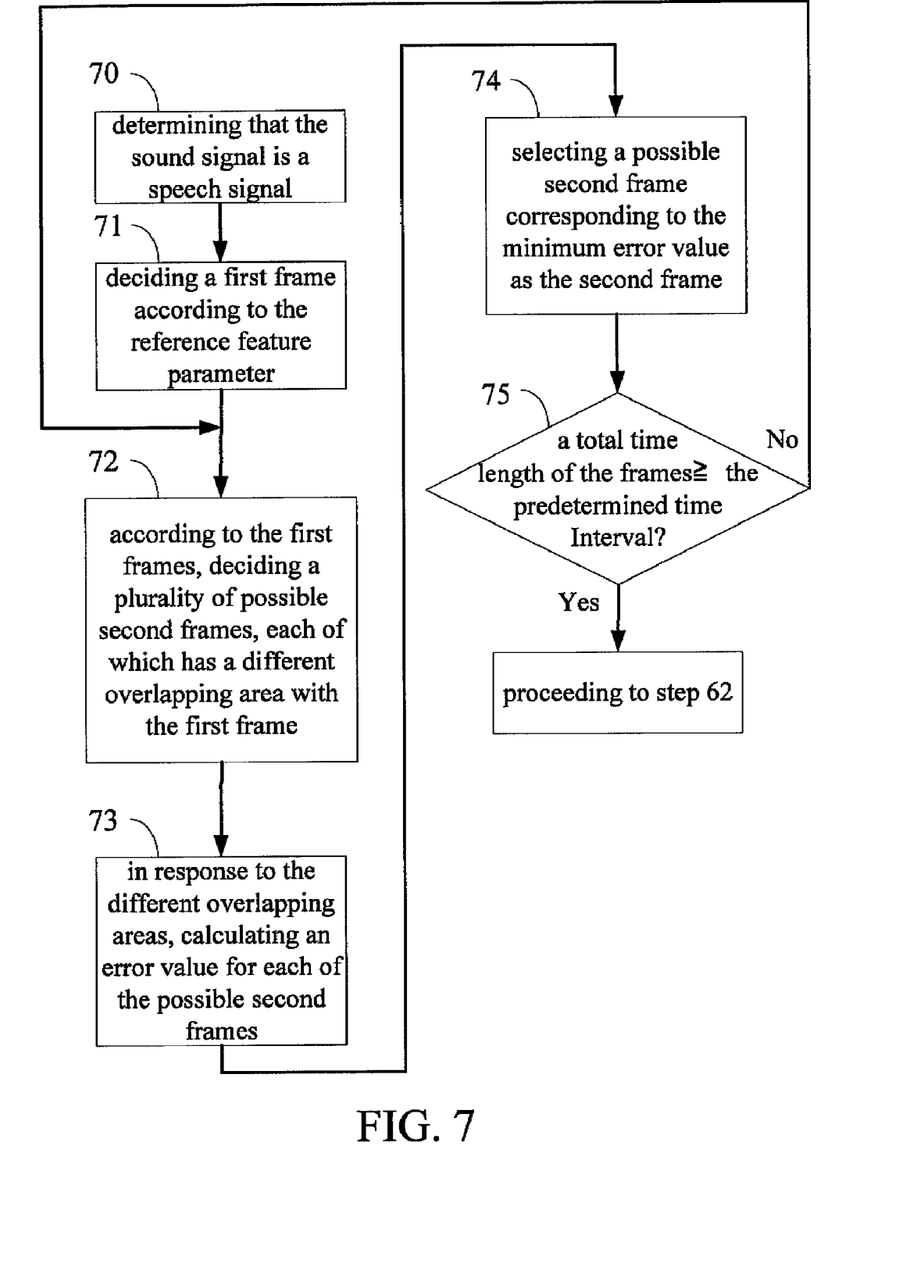
FIG. 7 is a detailed flow chart of step 61 in the second embodiment.

Particularly, step 52 decides the sound feature parameter in the steps 60 to 64 of the flow chart illustrated in FIG. 6. First, a reference feature parameter is decided in step 60, and according to this reference feature parameter, a plurality of frames of the sound signal within a predetermined time interval are decided in step 61. More particularly, step 61 decides these frames in the steps 70 to 75 of a flow chart illustrated in FIG. 7. To accomplish step 61, step 71 determines whether the sound signal is a speech signal. Then a first frame of these frames is decided in step 71. According to the first frame, a plurality of possible second frames within the predetermined time interval are decided in step 72, wherein each of the possible second frames has a different overlapping area with the first frame respectively. Subsequently, an error value is calculated for each of these possible second frames in step 73, and the possible second frame corresponding to the minimum of these error values is selected as the next frame in step 74. After that, step 75 determines whether a total time length of the frames is not greater than a predetermined length of time interval. If not, then this process proceeds to step 72; if so, step 61 is completed and the process proceeds to step 62.

Figure 8:
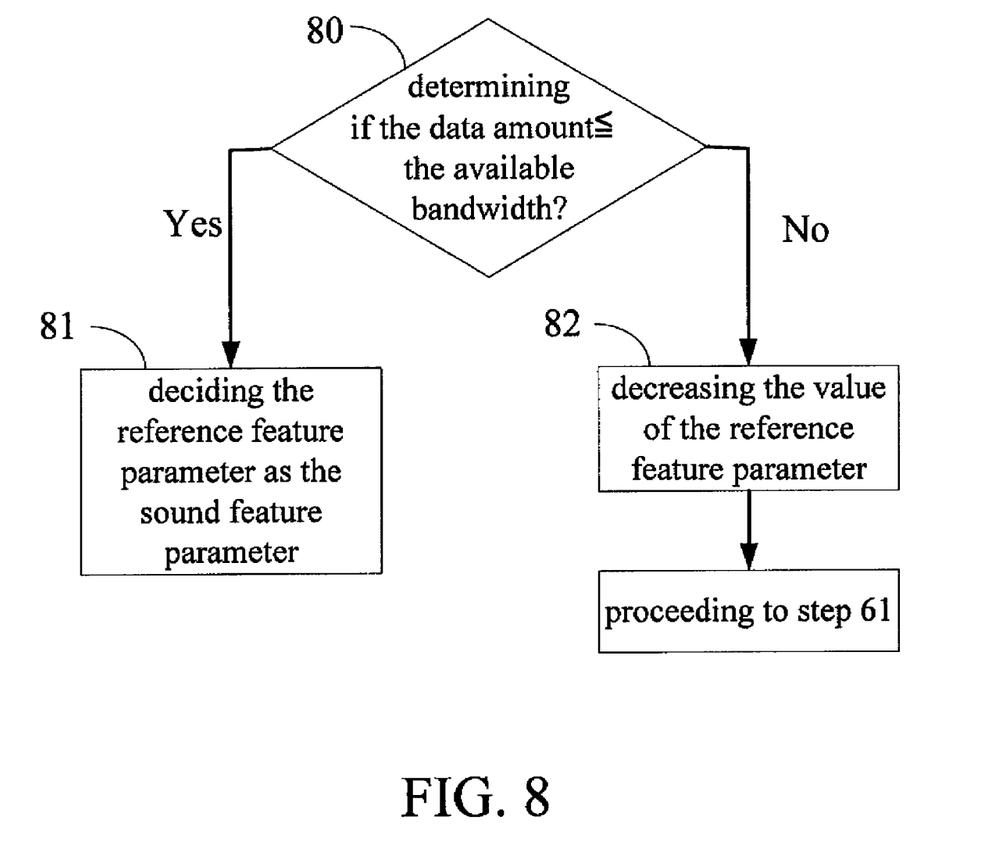
FIG. 8 is a detailed flow chart of step 64 in the second embodiment.

In step 62, a number of the frames within the predetermined time interval is calculated. Then in step 63, a data amount contained within the predetermined time interval is calculated according to the number of the frames and the reference feature parameter. Subsequently, the sound feature parameter is decided according to the data amount and the available bandwidth in step 64. Particularly, step 64 decides the sound feature parameter in steps 80 to 82 of a flow chart illustrated in FIG. 8 Step 64 executes step 80 to determine if the data amount is smaller than or equal to the available bandwidth. If so, then the reference feature parameter is decided as the sound feature parameter in step 81. If not, the value of the reference feature parameter is decreased in step 82, and the process executes step 61 again.

Referring back to FIG. 5, once the sound feature parameter has been decided, a sound feature signal is retrieved from the sound signal according to the sound feature parameter in step 53. In this embodiment, the sound feature parameter is an order of the LPCC, so the sound feature signal is generated by retrieving the LPCC of the sound signal according to the order of the LPCC in step 53. Next, a sound feature message related to the sound signal is retrieved in step 54, and a packet comprising the sound feature signal and the sound feature message is generated in step 55. Finally, the packet is transmitted to a server in step 56, thereby to transmit the sound feature signal and the sound feature message to the server.

In addition to the above steps illustrated in FIG. 5, the second embodiment may further execute all the operations and functions of the apparatus 3 of the first embodiment. Those skilled in this field should be able to straightforwardly realize how the second embodiment performs these operations and functions based on the above descriptions of the first embodiment. Thus, no unnecessary detail is given here.

Figure 9:
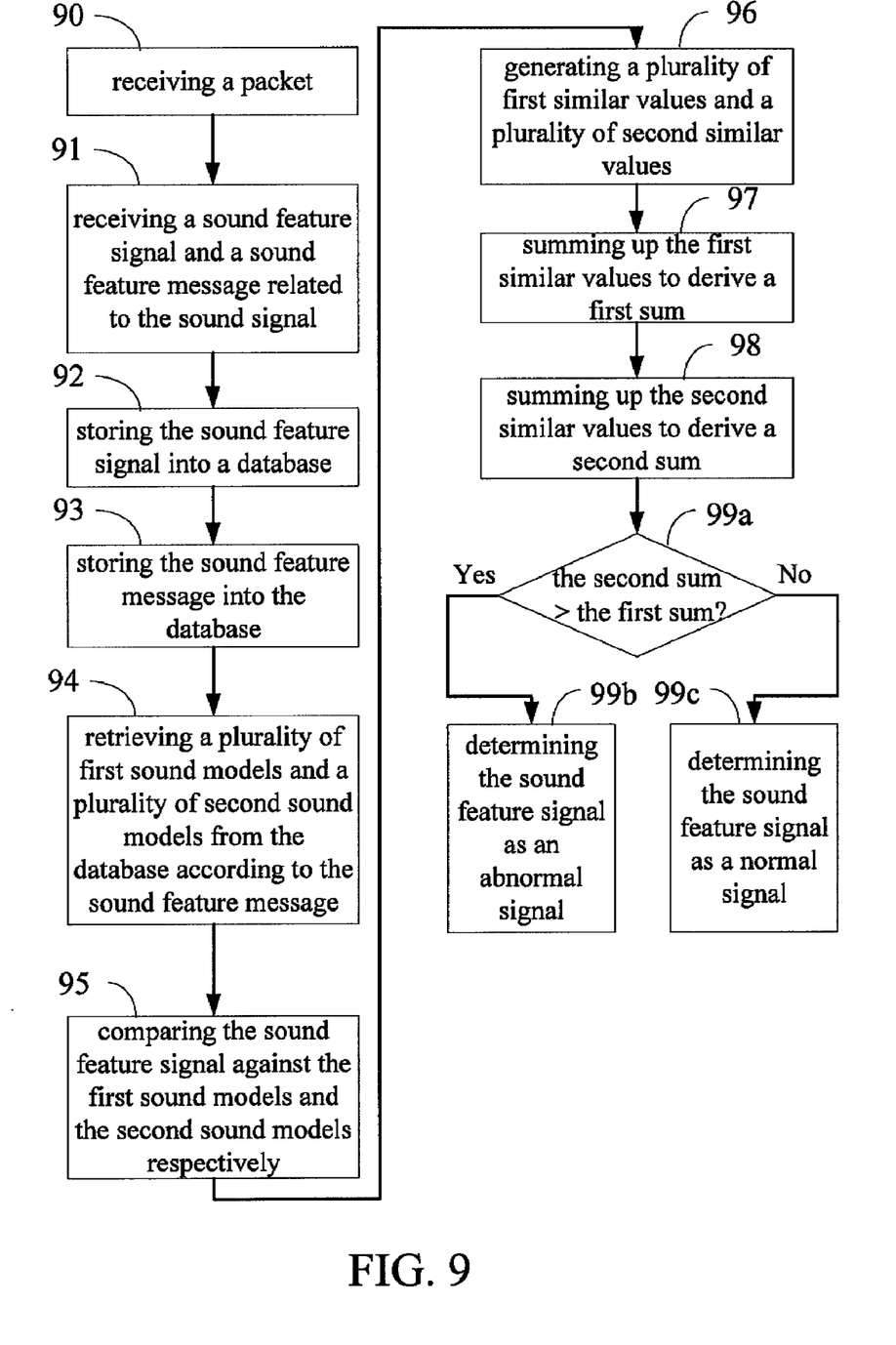
FIG. 9 is a flow chart of a third embodiment.

A third preferred embodiment of the present invention is illustrated in FIG. 9, which is a flow chart of a method for recognizing a sound signal. This method begins with step 90, where a packet comprising the sound feature signal and the sound feature message related to the sound signal is received. Then, in step 91, the sound feature signal and the sound feature message related to the sound signal is received; in other words, the sound feature signal and the sound feature message are retrieved from the packet in step 91. Afterwards, the sound feature signal is stored into the database in step 92, and the sound feature message is stored into the database in step 93. Here, the sound feature message is stored in a lookup table into the database.

Next in step 94, a plurality of first sound models and a plurality of second sound models are retrieved from the database according to the sound feature message. Then, the sound feature signal is compared with the first sound models and the second sound models respectively in step 95. Based on the comparison result, a plurality of first similar values and a plurality of second similar values are obtained in step 96. The first similar values are summed up to derive a first sum in step 97, and the second similar values are summed up to derive the second sum in step 98. Afterwards, step 99a is executed to determine if the second sum is greater than the first sum. If so, then the sound feature signal is determined as an abnormal signal in step 99b. If not, the process proceeds to step 99c, where the sound feature signal is determined as a normal signal.

In addition to the above steps illustrated in FIG. 9, the third embodiment may further execute all the operations and functions of the server 4 of the first embodiment. Those skilled in this field should be able to straightforwardly realize how the third embodiment performs these operations and functions based on the above descriptions of the first embodiment. Thus, no unnecessary detail is given here.

Each of the aforementioned methods can use a tangible machine-readable medium for storing a computer program to execute the aforementioned steps. The tangible machine-readable medium can be a floppy disk, a hard disk, an optical disc, a flash disk, a tape, a database accessible from a network or a storage medium with the same functionality that can be easily thought by people skilled in the art.

In summary, the apparatus of the present invention is configured to sense a sound signal in the environment where it is located, to retrieve a feature signal and a feature message from the sound signal and to transmit them to a server. Upon receiving the feature signal and the feature message of the sound signal, the server retrieves pre-stored sound models according to the feature message and compares the feature signal with the pre-stored sound models, thereby to determine if the sound signal is abnormal. According to the present invention, only the feature signal of the sound signal is sent to the server. As a result, the real-time response of the sound detection system is effectively mitigated and determination result on the sound signal is more accurate.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for processing a sound signal, comprising the steps of:
    (a) detecting the sound signal;
    (b) detecting an available bandwidth of a network;
    (c) deciding a reference feature parameter;
    (d) deciding a plurality of frames of the sound signal within a predetermined length of time interval according to the reference feature parameter by the following steps:
        (d1) determining the sound signal being a speech signal;
        (d2) deciding a first frame of the frames according to the reference feature parameter;
        (d3) deciding a plurality of possible second frames according to the first frame, each of the possible second frames has an overlapped area with the first frame, and the overlapped areas are different from each other;
        (d4) calculating a value of error according to each of the possible second frames;
        (d5) deciding a second frame of the frames to be the possible second frame that corresponds to the smallest value of error; and
        (d6) repeating the step (d3), step (d4), and step (d5) until a length of time interval of the frames is greater than or equal to the predetermined length of time interval;
    (e) calculating a number of the frames within the predetermined length of time interval;
    (f) calculating a data amount within the predetermined length of time interval according to the number of the frames and the reference feature parameter;
    (g) deciding a sound feature parameter by the data amount and the available bandwidth;
    (h) retrieving a sound feature signal from the sound signal according to the sound feature parameter, wherein the sound feature signal is a feature of the sound signal;
    (i) retrieving a sound feature message relating to the sound signal, wherein the sound feature message comprises the sound feature parameter; and
    (j) transmitting the sound feature signal and the sound feature message to a server.

2. The method of claim 1, further comprising the step of: generating a packet comprising the sound feature signal and the sound feature message; wherein the transmitting step transmits the sound feature signal and the sound feature message by transmitting the packet via the network.

3. The method of claim 1, wherein the value of error is a linear prediction coefficient residual error.

4. The method of claim 1, wherein the step (g) comprises the steps of:
    determining the data amount being smaller than or equal to the available bandwidth; and
    deciding the sound feature parameter as the reference feature parameter.

5. The method of claim 1, wherein the step (g) comprises the steps of:
    determining the data amount being greater than the available bandwidth;
    decreasing the reference feature parameter; and
    repeating the step (d), step (e), step (f), and step (g).

6. An apparatus for processing a sound signal, wirelessly connected to a server via a network, the apparatus comprising:
    a first detection module for detecting the sound signal;
    a second detection module for detecting an available bandwidth of the network;
    a decision module for performing the following operations:
        (a) deciding a reference feature parameter,
        (b) deciding a plurality of frames of the sound signal within a predetermined length of time interval according to the reference feature parameter by the following operations:
            (b1) determining the sound signal being a speech signal, (b2) deciding a first frame of the frames according to the reference feature parameter, (b3) deciding a plurality of possible second frames according to the first frame, each of the possible second frames has an overlapped area with the first frame, and the overlapped areas are different from each other, (b4) calculating a value of error according to each of the possible second frames, (b5) deciding a second frame of the frames to be the possible second frame that corresponds to the smallest value of error, and (b6) repeating (b3), (b4), and (b5) until a length of time interval of the frames is greater than or equal to the predetermined time interval,
        (c) calculating a number of the frames within the predetermined length of time interval,
        (d) calculating a data amount within the predetermined length of time interval according to the frame number and the reference feature parameter, and
        (e) deciding the sound feature parameter by the data amount and the available bandwidth;
    a retrieval module for retrieving a sound feature signal from the sound signal according to the sound feature parameter and retrieving a sound feature message relating to the sound signal, wherein the sound feature signal is a feature of the sound signal and the sound feature message comprises the sound feature parameter; and
    a transmission module for transmitting the sound feature signal and the sound feature message to the server.

7. The apparatus of claim 6, further comprising:
    a generation module for generating a packet comprising the sound feature signal and the sound feature message;
    wherein the transmission module transmits the sound feature signal and the sound feature message by transmitting the packet via the network.

8. The apparatus of claim 6, wherein the value of error is a linear prediction coefficient residual error.

9. The apparatus of claim 6, wherein the decision module further determines the data amount being smaller than or equal to the available bandwidth and decides the sound feature parameter as the reference feature parameter.

10. The apparatus of claim 6, wherein the decision module further determines the data amount being greater than the available bandwidth, decreases the reference feature parameter, and repeats (b), (c), (d), and (e).

11. A non-transitory tangible machine-readable medium storing a computer program to enable an apparatus to execute a method for processing a sound signal, the method comprising the steps of:
- (a) enabling the apparatus to detect the sound signal;
- (b) enabling the apparatus to detect an available bandwidth of a network;
- (c) enabling the apparatus to decide a reference feature parameter;
- (d) enabling the apparatus to decide a plurality of frames of the sound signal within a predetermined length of time interval according to the reference feature parameter by the following steps:
  - (d1) enabling the apparatus to determine the sound signal being a speech signal;
  - (d2) enabling the apparatus to decide a first frame of the frames according to the reference feature parameter;
  - (d3) enabling the apparatus to decide a plurality of possible second frames according to the first frame, each of the possible second frames has an overlapped area with the first frame, and the overlapped areas are different form each other;
  - (d4) enabling the apparatus to calculate a value of error according to each of the possible second frames;
  - (d5) enabling the apparatus to decide a second frame of the frames to be the possible second frame that corresponds to the smallest value of error; and
  - (d6) enabling the apparatus to repeat step (d3), step (d4), and step (d5) until a length of time interval of the frames is greater than or equal to the predetermined length of time interval;
- (e) enabling the apparatus to calculate a number of the frames within the predetermined length of time interval;
- (f) enabling the apparatus to calculate a data amount within the predetermined length of time interval according to the number of the frames and the reference feature parameter;
- (g) enabling the apparatus to decide the sound feature parameter by the data amount and the available bandwidth;
- (h) enabling the apparatus to retrieve a sound feature signal from the sound signal according to the sound feature parameter, wherein the sound feature signal is a feature of the sound signal and the sound feature message comprises the sound feature parameter;
- (i) enabling the apparatus to retrieve a sound feature message relating to the sound signal; and
- (j) enabling the apparatus to transmit the sound feature signal and the sound feature message to a server.

12. The non-transitory tangible machine-readable medium of claim 11, wherein the method further comprises the steps of:
enabling the apparatus to generate a packet comprising the sound feature signal and the sound feature message;
wherein the transmitting step enables the apparatus to transmit the sound feature signal and the sound feature message by transmitting the packet via the network.

13. The non-transitory tangible machine-readable medium of claim 11, wherein the value of error is a linear prediction coefficient residual error.

14. The non-transitory tangible machine-readable medium of claim 11, wherein the step (g) comprises the steps of:
enabling the apparatus to determine the data amount being smaller than or equal to the available bandwidth; and
enabling the apparatus to decide the sound feature parameter as the reference feature parameter.

15. The non-transitory tangible machine-readable medium of claim 11, wherein the step (g) comprises the steps of:
enabling the apparatus to determine the data amount being greater than the available bandwidth;
enabling the apparatus to decrease the reference feature parameter; and
enabling the apparatus to repeat step (d), step (e), step (f), and step (g).

16. A method for recognizing a sound signal, comprising the steps of:
- (a) receiving a sound feature signal and a sound feature message relating to the sound signal;
- (b) retrieving a plurality of first sound models and a plurality of second sound models from a database according to the sound feature message;
- (c) comparing the sound feature signal with the first sound models to generate a plurality of first similar values;
- (d) comparing the sound feature signal with the second sound models to generate a plurality of second similar values;
- (e) summing up the first similar values to derive a first sum;
- (f) summing up the second similar values to derive a second sum; and
- (g) determining the sound feature signal being an abnormal signal according to the first sum and the second sum
wherein the sound feature signal and the sound feature message are generated by a method comprising the steps of detecting the sound signal, detecting an available bandwidth of a network, deciding a sound feature parameter according to the available bandwidth, retrieving a sound feature signal from the sound signal according to the sound feature parameter, and retrieving a sound feature message relating to the sound signal, wherein the sound feature signal is a feature of the sound signal and the sound feature message comprises the sound feature parameter.

17. The method of claim 16, further comprising the step of:
receiving a packet comprising the sound feature signal and the sound feature message;
wherein the step (a) receives the sound feature signal and the sound feature message by receiving the packet.

18. The method of claim 16, further comprising steps of:
storing the sound feature signal into the database; and
storing the sound feature message into the database.

19. The method of claim 18, wherein the sound feature message is stored in a lookup table in the database.

20. A server for recognizing a sound signal, comprising:
a database for storing a plurality of first sound models and a plurality of second sound models;
a receiving module for receiving a sound feature signal and a sound feature message relating to the sound signal;
a retrieval module for retrieving the first sound models and the second sound models from the database according to the sound feature message;
a comparison module for comparing the sound feature signal with the first sound models to generate a plurality of first similar values and for comparing the sound feature signal with the second sound models to generate a plurality of second similar values;

a calculation module for summing up the first similar values to derive a first sum and for summing up the second similar values to derive a second sum; and a determination module for determining the sound feature signal being an abnormal signal according to the first sum and the second sum wherein the sound feature signal and the sound feature message are generated by an apparatus wirelessly connected to the server, the apparatus generates the sound feature signal and the sound feature message by detecting the sound signal, detecting an available bandwidth of a network, deciding a sound feature parameter according to the available bandwidth, retrieving a sound feature signal from the sound signal according to the sound feature parameter, and retrieving a sound feature message relating to the sound signal, wherein the sound feature signal is a feature of the sound signal and the sound feature message comprises the sound feature parameter.

21. The server of claim 20, wherein the receiving module receives a packet comprising the sound feature signal and the sound feature message.

22. The server of claim 20, further comprising:
a storing module for storing the sound feature signal and the sound feature message into the database.

23. The server of claim 20, wherein the sound feature message is stored in a lookup table in the database.

24. A non-transitory tangible machine-readable medium storing a computer program to enable a server to execute a method for recognizing a sound signal, and the method for recognizing comprising the steps of:
(a) enabling the server to receive a sound feature signal and a sound feature message relating to the sound signal;
(b) enabling the server to retrieve a plurality of first sound models and a plurality of second sound models from a database according to the sound feature message;
(c) enabling the server to compare the sound feature signal with the first sound models to generate a plurality of first similar values;
(d) enabling the server to compare the sound feature signal with the second sound models to generate a plurality of second similar values;
(e) enabling the server to sum up the first similar values to derive a first sum;
(f) enabling the server to sum up the second similar values to derive a second sum; and
(g) enabling the server to determine the sound feature signal being an abnormal signal according to the first sum and the second sum,
wherein another computer program stored in another tangible machine-readable medium is able to enable an apparatus to execute the method for processing the sound signal, the method for processing the sound signal generates the sound feature signal and the sound feature message by the steps of enabling the apparatus to detect the sound signal, enabling the apparatus to detect an available bandwidth of a network, enabling the apparatus to decide a sound feature parameter according to the available bandwidth, enabling the apparatus to retrieve a sound feature signal from the sound signal according to the sound feature parameter, enabling the apparatus to retrieve a sound feature message relating to the sound signal, and enabling the apparatus to transmit the sound feature signal and the sound feature message to a server, wherein the sound feature signal is a feature of the sound signal and the sound feature message comprises the sound feature parameter.

25. The non-transitory tangible machine-readable medium of claim 24, wherein the method for recognizing further comprises the step of:
enabling the server to receive a packet comprising the sound feature signal and the sound feature message;
wherein the step (a) receives the sound feature signal and the sound feature message by receiving the packet.

26. The non-transitory tangible machine-readable medium of claim 24, wherein the method for recognizing further comprises steps of:
enabling the server to store the sound feature signal into the database; and
enabling the server to store the sound feature message into the database.

27. The non-transitory tangible machine-readable medium of claim 26, wherein the sound feature message is stored in a lookup table in the database.

* * * * *